United States Patent [19]

Uchibori

[11] Patent Number: 5,946,717
[45] Date of Patent: Aug. 31, 1999

[54] MULTI-PROCESSOR SYSTEM WHICH PROVIDES FOR TRANSLATION LOOK-ASIDE BUFFER ADDRESS RANGE INVALIDATION AND ADDRESS TRANSLATION CONCURRENTLY

[75] Inventor: Katsuaki Uchibori, Tokyo, Japan

[73] Assignee: NEC Corporation, Tokyo, Japan

[21] Appl. No.: 08/680,268

[22] Filed: Jul. 11, 1996

[30] Foreign Application Priority Data

Jul. 13, 1995 [JP] Japan ................................... 7-201404

[51] Int. Cl.⁶ ................................................... G06F 12/10
[52] U.S. Cl. ........................................................ 711/207
[58] Field of Search ................................... 711/206, 207,
711/150, 154, 205, 118, 119, 124, 131,
141, 146

[56] References Cited

U.S. PATENT DOCUMENTS

| | | | |
|---|---|---|---|
| 4,733,350 | 3/1988 | Tone et al. | 711/207 |
| 5,437,017 | 7/1995 | Moore et al. | 711/206 |
| 5,440,710 | 8/1995 | Richter et al. | 711/207 |
| 5,455,922 | 10/1995 | Eberhard et al. | 711/154 |
| 5,497,480 | 3/1996 | Hayes et al. | 711/207 |
| 5,710,903 | 1/1998 | Horiuchi et al. | 711/207 |

FOREIGN PATENT DOCUMENTS 63-004357  1/1988  Japan .
1-232462   9/1989  Japan .

OTHER PUBLICATIONS

French Search Report dated Aug. 29, 1997 (with English translation of pertinent portion indicating degree of relevance).

*Primary Examiner*—Jack A. Lane
*Assistant Examiner*—Gary J. Portka
*Attorney, Agent, or Firm*—McGinn & Gibb, P.C.

[57] ABSTRACT

In a multi-processor system, a translation look-aside buffer in a processor can be invalidated without stopping operations of other processors of the multi-processor system. Each processor has a range comparator including an address compare circuit which detects whether a logical address to access the main storage is in an address range being invalidated (e.g., updated), a pending indicator which stops translating the logical address when the address is detected to be in the address range, and a restart indicator which restarts translation of the logical address when the logical address is out of the address range.

20 Claims, 6 Drawing Sheets

MULTI-PROCESSOR SYSTEM WHICH PROVIDES FOR TRANSLATION LOOK-ASIDE BUFFER ADDRESS RANGE INVALIDATION AND ADDRESS TRANSLATION CONCURRENTLY

BACKGROUND OF THE INVENTION

The present invention relates to a multi-processor and method for controlling an access to a translation look-aside buffer (TLB), and more particularly to a multi-processor system and method for controlling an access to a translation look-aside buffer which has been invalidated (e.g., updated).

As is well-known, virtual memory provides a virtual (logical) address space using an auxiliary storage to save a sufficiently wide address space beyond the physical capacity limit of a main memory. The virtual address space is assigned to the real (physical) address of the main memory. Generally, the virtual memory concept makes the normal-sized main memory appear to the user as large as the virtual-address space (e.g., represented by a register or the like holding the virtual address), while still appearing to run at essentially the speed of the actual memory.

In a virtual memory system with paged segmentation, virtual memory areas are divided into variable-size blocks called "segments", and each segment is divided into fixed-size blocks called "pages". Active blocks are placed on (e.g., dynamically paged into) the main memory, while the remaining blocks are placed on the auxiliary storage.

Figure 1:
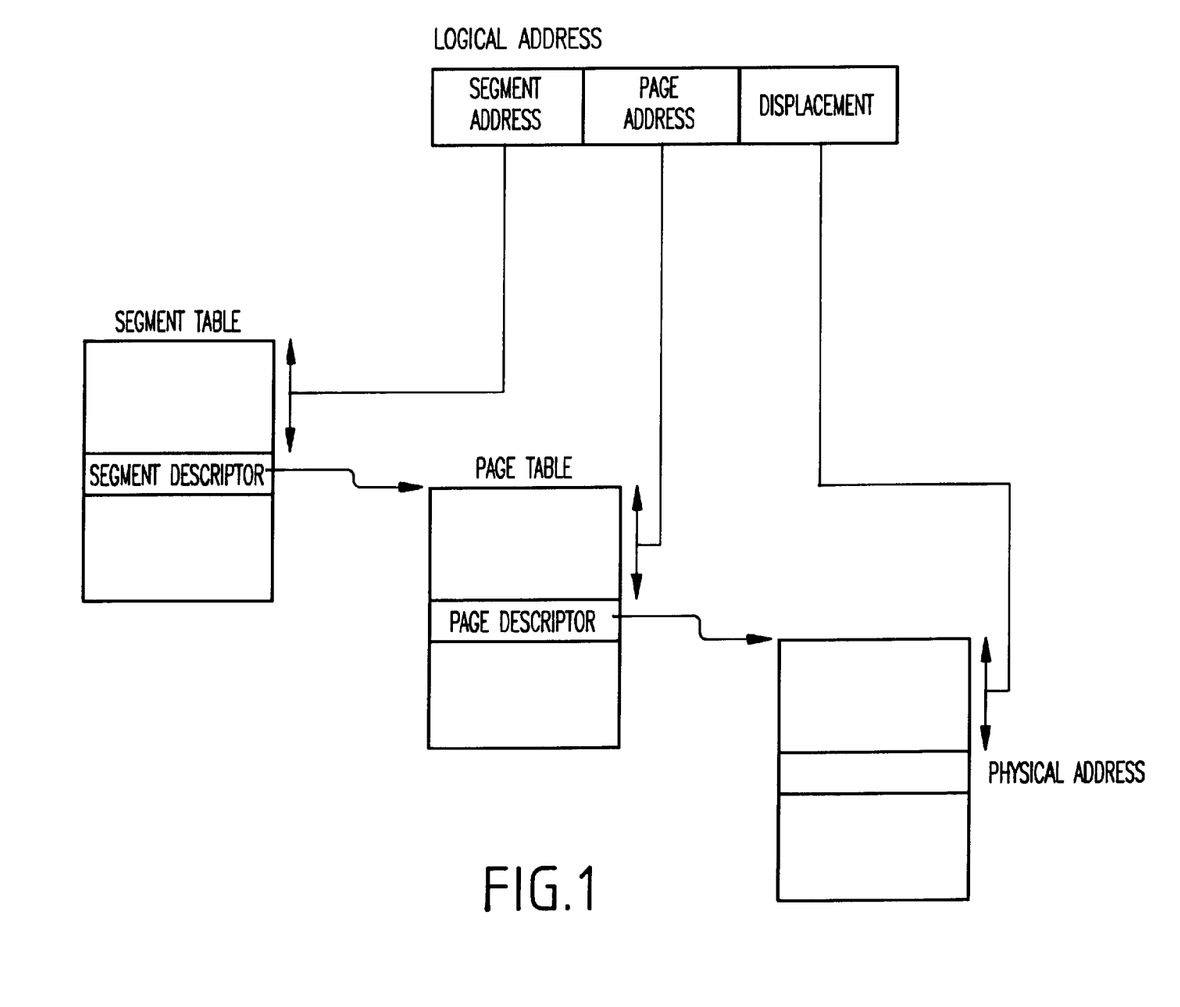
FIG. 1 shows an address translation from a logical address to a physical address.

Referring to FIG. 1, each logical address comprises three parts: a segment address, a page address, and a displacement. The segment address is a relative address in a segment table. The page address is a relative address in a page table. The displacement is a relative address in a page. The segment table stores segment descriptors specifying page tables. The page table stores page descriptors specifying pages.

A translation look-aside buffer (TLB) of a processor is a special type of cache for storing (e.g., registering) pairs of logical addresses and physical addresses. Thus, a logical address will be stored with a corresponding physical address as a pair. The TLB of the processor is referenced each time the main memory is accessed, thereby to perform the translation from a logical address to a physical address. When an entry in the TLB must be deallocated (e.g., at the end of a process), the entry is invalidated (e.g., deleted or updated).

In a conventional multi-processor system with virtual memory, when a processor issues a message to invalidate an entry in its TLB, the message is sent to all of the TLBs of the processors in the multi-processor system. During the invalidating process, prior to performing other processes, other processors must wait for completion of the TLB entry invalidating process.

Thus, normal operations cannot be performed until the TLB entry invalidating operation is completed, since other processors are in "waiting" (pause) states. This waiting by the other processors lowers the system performance.

SUMMARY OF THE INVENTION

In view of the foregoing problem of the conventional system, an object of the present invention is to provide a multi-processor system in which, while a translation look-aside buffer is being invalidated by a certain processor, other processors may operate without waiting for the completion of the invalidating of the translation look-aside buffer.

In a multi-processor system according to a first aspect of the present invention, each of a plurality of processors has a translation look-aside buffer for registering pairs of logical addresses and physical addresses, an invalidation controller for invalidating the translation look-aside buffer, and a range comparator for comparing a designated logical address with an address range in the invalidation controller being invalidated by the invalidation controller, and for translating the designated logical address when the designated logical address is out of the address range.

With the unique and unobvious structure of the present invention, operations other than accessing a translation look-aside buffer being updated can be executed by the other processors without waiting.

BRIEF DESCRIPTION OF THE DRAWINGS

The above-mentioned and other objects, features and advantages of this invention will become more apparent by reference to the following detailed description of the invention taken in conjunction with the accompanying drawings in which.

DETAILED DESCRIPTION OF THE PREFERRED EMBODIMENT

A multi-processor system in accordance with a preferred embodiment of the present invention will be described in detail with reference to the accompanying drawings.

Figure 2:
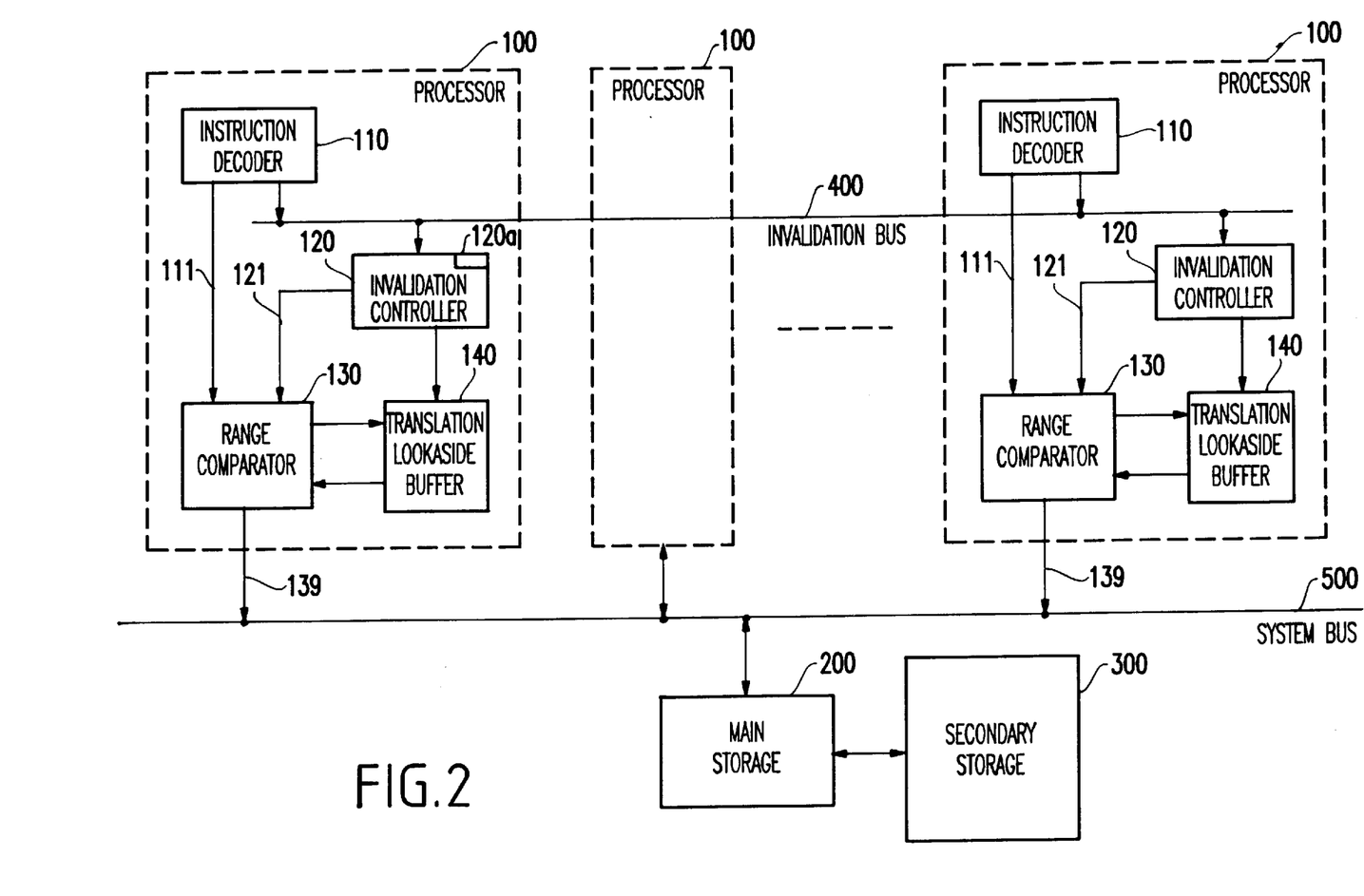
FIG. 2 is a block diagram showing the configuration of a multi-processor system according to an embodiment of the present invention.

Referring to FIG. 2, a multi-processor system in accordance with an embodiment of the present invention comprises a plurality of processors 100, a main storage 200, a secondary storage 300, an invalidation bus 400 interconnecting the processors 100, and a system bus 500 interconnecting the processors 100 and the main storage 200.

The main storage 200 stores blocks including programs and data. Blocks which are not often used are swapped out to the secondary storage 300. The main storage 200 also stores a segment table having segment descriptors and page tables having page descriptors.

Each processor 100 has an instruction decoder 110, an invalidation controller 120, a range comparator 130, and a translation look-aside buffer (TLB) 140.

The instruction decoder 110 decodes instructions from a program memory (not illustrated) in the processor one-by-one. If the decoded instruction is a TLB invalidation instruction, the instruction decoder 110 issues an invalidation message to the invalidation bus 400. If the decoded instruction requires access to the main memory 200, the instruction decoder 110 issues a logical address on signal line 111.

The invalidation controller 120 determines whether the invalidation message has been issued on the invalidation bus 400. If the invalidation message has been issued on the invalidation bus 400, the invalidation controller 120 issues a logical page information (described later) on a signal line 121. The invalidation controller 120 preferably has a register 120a for storing the logical page information.

The range comparator 130 compares the logical address on the signal line 111 with the logical page information on the signal line 121. If the logical address matches the logical page information, the range comparator 130 stops proceeding with the logical address translation. If there is no match, the range comparator 130 issues a logical page address to the translation look-aside buffer (TLB) 140, and receives a physical address, which corresponds to the logical page address (e.g., stored in the same pair as the physical address), from the TLB 140.

The translation look-aside buffer (TLB) 140 is a special cache for storing (e.g., registering) pairs of logical addresses and physical addresses. Each entry of the TLB 140 comprises a physical address and a valid bit. The TLB 140 is indexed by a logical address, and outputs the physical address if the valid bit is active.

Figure 3:
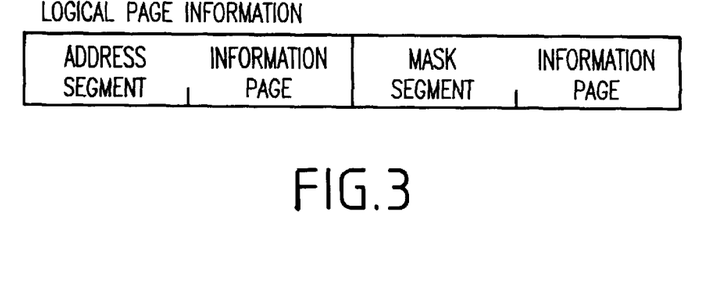
FIG. 3 illustrates a format of a logical page information.

Referring to FIG. 3, a logical page information from the invalidation controller 120 comprises address information and mask information. Each of the address information and the mask information is divided into a segment part and a page part. The address information is a logical page address being invalidated therewith. The mask information masks the page part of the address information when the TLB 140 is invalidated with a segment. Thus, the TLB 140 can be invalidated with a segment, as well as with a page.

For example, if the TLB 140 is invalidated with a page, then all bits of the mask information are "0"s. On the other hand, if the TLB 140 is invalidated with a segment, then bits of the segment part in the mask information are "0"s, and bits of the page part in the mask information are "1"s.

Figure 4:
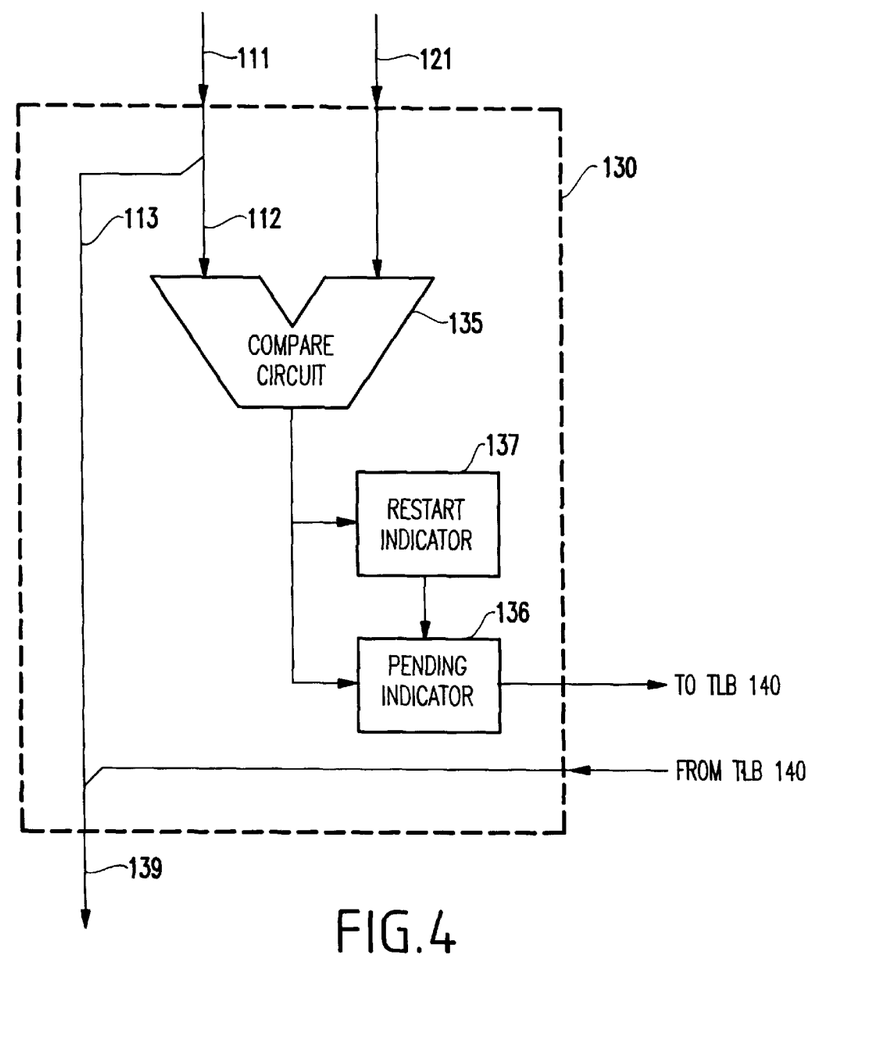
FIG. 4 is a block diagram showing the configuration of a range comparator 130 in a processor of the multi-processor system shown in FIG. 2.

Referring to FIG. 4, the range comparator 130 comprises an address compare circuit 135, a pending indicator 136, and a restart indicator 137. The signal line 111 is divided into a displacement signal line part 113 and a remaining (segment and page) signal line part 112. The signal line 112 is used as an input of the address compare circuit 135. The signal line 113 becomes signal line 139 associated with a physical page address from the TLB 140.

The address compare circuit 135 compares the logical address on the signal line 112 and the address part of the logical page information on the signal line 121 from the invalidation controller 120. When the address compare circuit 135 detects coincidence, the pending indicator 136 stops translating the logical address until the restart indicator 137 indicates restarting the logical address translation. The restart indicator 137 detects changes in the address compare circuit 135 of coincidence to incoincidence.

Figure 5:
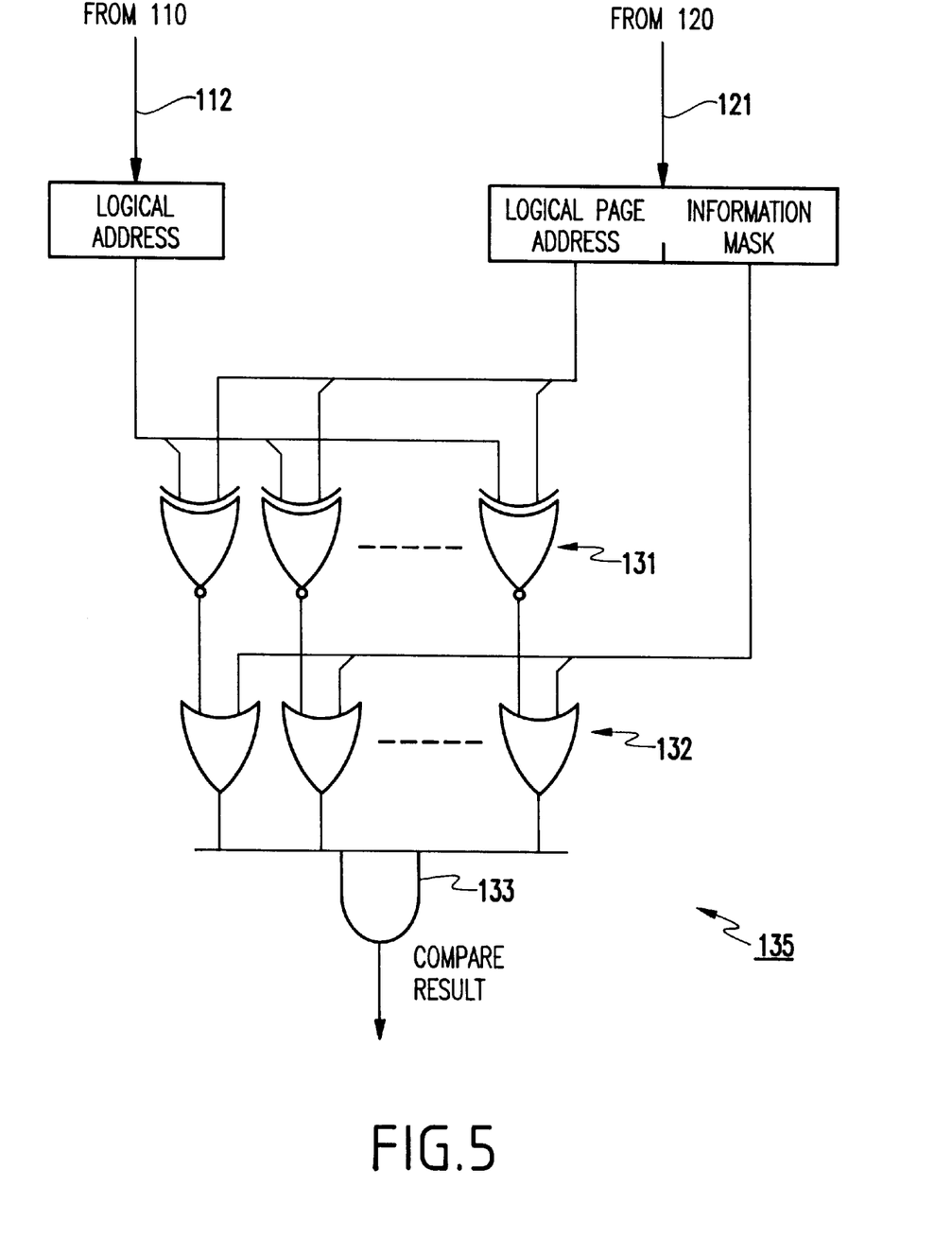
FIG. 5 is a block diagram showing the configuration of an address compare circuit 135 in the range comparator 130 of FIG. 4.

Referring to FIG. 5, the address compare circuit 135 in the range comparator 130 comprises exclusive-NOR (EXNOR) gates 131, OR gates 132, and an AND gate 133. Each EXNOR gate 131 compares a corresponding bit of the logical address on the signal line 112 and the address part of the logical page information on the signal line 121 from the invalidation controller 120, and outputs "1" if both bits are equal.

The OR gates 132 perform logical OR operations between outputs of the EXNOR gates 131 and the mask part of the logical page information on the signal line 121. Thus, the OR gates 132 mask the address compare.

The AND gate 133 performs a logical AND operation among outputs of the OR gates 132. Thus, the AND gate 133 outputs "1" if the logical address on the signal line 112 is in a range of the address part of the logical page information on the signal line 121 from the invalidation controller 120.

Hereinbelow and referring to FIGS. 2–7, the operation of the multi-processor system in accordance with the above-mentioned embodiment of the present invention will be described.

Figure 6:
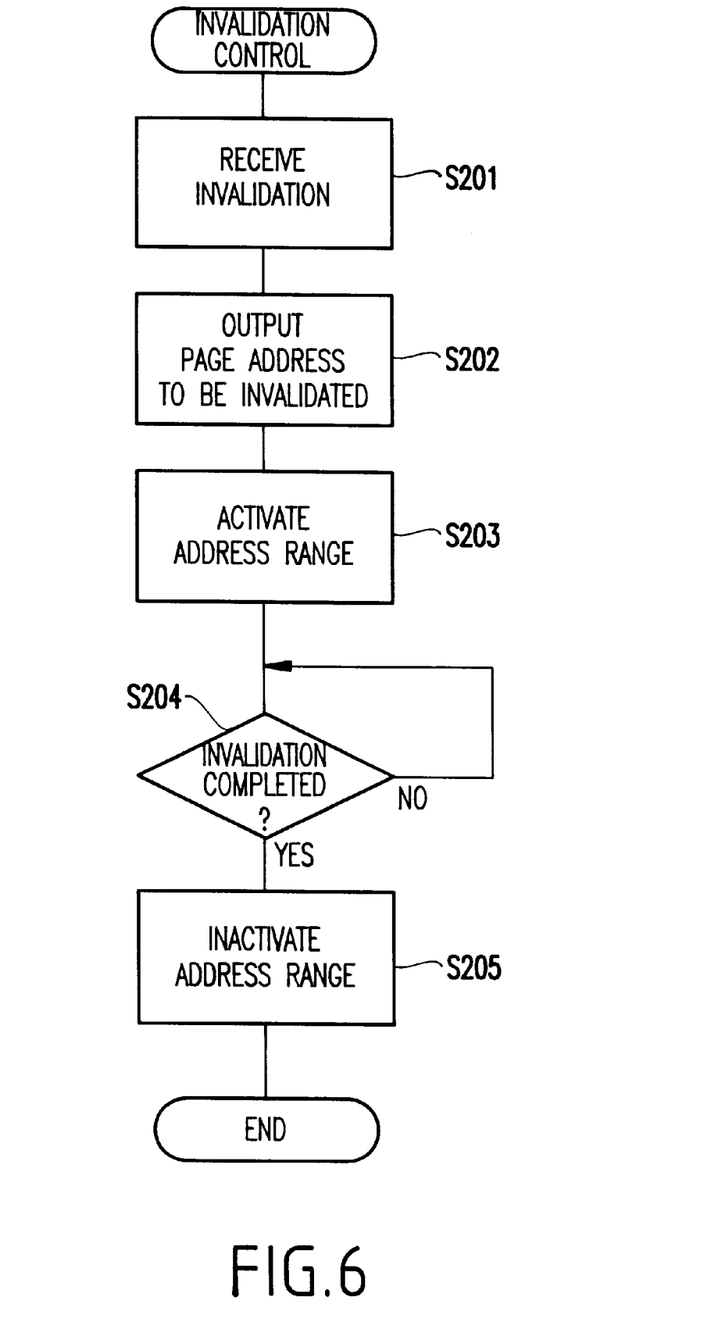
FIG. 6 is a flowchart showing the invalidation operation of an invalidation controller 120 in a processor of the multi-processor system shown in FIG. 2.

Referring to FIG. 6, when the invalidation controller 120 receives an invalidation message via the invalidation bus 400 in step S201, the invalidation controller 120 outputs a logical page address to be invalidated to the TLB 140 in step S202, and the invalidation controller 120 activates a logical page information to the signal line 121 in step S203. This activation of the logical page information continues until the invalidation of the logical page address is completed and the entire address range is inactivated (steps S204 and S205).

Figure 7:
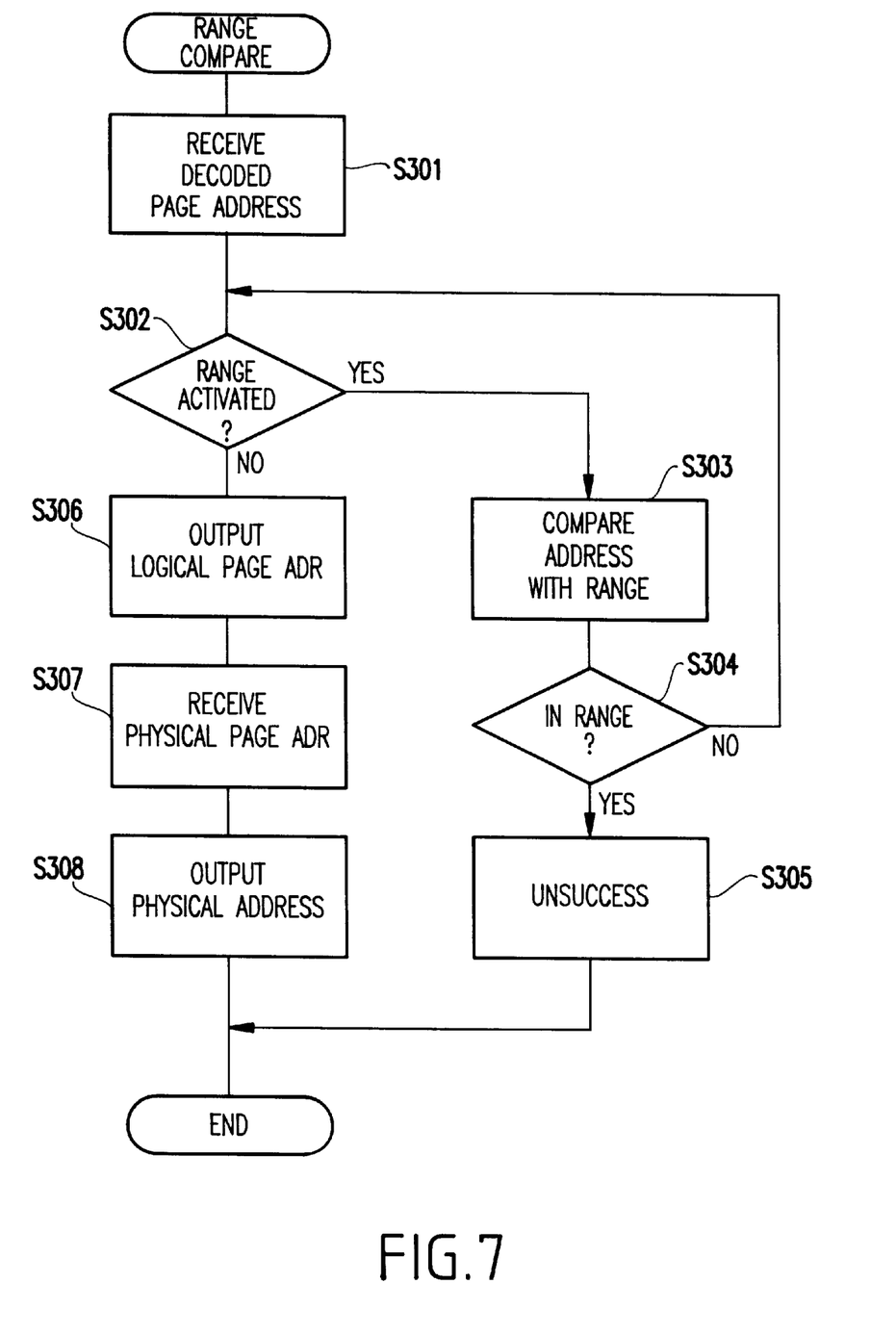
FIG. 7 is a flowchart showing the compare operation of the range comparator 130 of FIG. 4.

Referring to FIG. 7, when the range comparator 130 receives a logical address from the instruction decoder 110 via the signal line 111 in step S301, if the logical page information is inactivated (e.g., a "0") in the invalidation controller 120 in step S302, then the range comparator 130 continues to translate the logical address in steps S306 through S308. That is, the range comparator 130 outputs the logical page address to the TLB 140 in step S306, and receives a physical page address from the TLB 140 in step S307. Thereafter, the range comparator 130 cutputs the physical address to the main storage 200 via signal line 139 and the system bus 500, in step S308.

If the logical page information is activated (e.g., a "1") in the invalidation controller 120 in step S302, the range comparator 130 determines whether the logical address on the signal 112 (see FIG. 4) is in a range of the logical page information from the invalidation controller 120 in step S303. If the logical address is in the range in step S304, the range comparator 130 stops the logical address translation in step S305. If the logical address is out of the range in step S304, the range comparator 130 waits for the completion of the invalidation (e.g., updating) of the TLB 140 to continue the logical address translation.

In the above embodiment, since the invalidation of the entry in the TLB has been completed before processing of the instruction after the TLB invalidation instruction, the consistency between logical addresses and physical addresses in all of the processors of the multi-processor system is ensured (e.g., no coherency errors). The present invention has been described by taking a preferred embodiment as an example, but it is not necessarily limited to the above embodiment.

As is apparent from the above description, according to the present invention, the access to the TLB being invalidated in a first processor of a multi-processor system can be blocked without interfering or affecting the operations of other processors of the multi-processor system. Thus, even when the TLB is being updated, the processing operations by the other processors, other than the access to the TLB being invalidated, can be executed. Thus, the multi-processor system has increased performance as compared to the conventional system.

While the invention has been described in terms of a single preferred embodiment, those skilled in the art will recognize that the invention can be practiced with modification within the spirit and scope of the appended claims.

What is claimed is:

1. A multi-processor system having a plurality of processors and a memory, each of said processors comprising:

a first translation look-aside buffer for storing pairs of logical addresses and physical addresses;

an invalidation controller for invalidating an address range in said translation look-aside buffer; and a range comparator for comparing a designated logical address with that address range in a translation look-aside buffer of another processor which is currently being invalidated by said invalidation controller of said another processor, and for allowing the translation of the designated logical address into a physical address by said first translation look-aside buffer when the designated logical address is out of the address range.

2. The multi-processor system according to claim 1, said range comparator comprising:

an address compare circuit for comparing the designated logical address with the address range being invalidated; and a pending indicator for stopping address translation of said designated logical address, when said address compare circuit detects that the designated logical address is in the address range.

3. The multi-processor system according to claim 2, said address compare circuit comprising:

a plurality of coincidence gates for detecting coincidence between the designated logical address and the address range;

a plurality of mask gates, connected to said plurality of coincidence gates, for masking bits indicated by the address range; and a gate, connected to said plurality of mask gates, for performing a logical operation on outputs of said plurality of mask gates.

4. The multi-processor system according to claim 3, each of said plurality of coincidence gates comprising an exclusive-NOR gate.

5. The multi-processor system according to claim 3, each of said plurality of mask gates comprising an OR gate.

6. The multi-processor system according to claim 3, said gate comprising an AND gate.

7. The multi-processor system according to claim 2, said range comparator further comprising:

a restart indicator for restarting the address translation, when said address compare circuit detects that the designated logical address is out of the address range.

8. The multi-processor system according to claim 1, said invalidation controller comprising:

a register for storing the address range being invalidated.

9. The multi-processor system according to claim 1, each of said processors further comprising:

an instruction decoder, connected to said range comparator, for decoding an instruction to detect one of a first instruction for accessing said first translation look-aside buffer and a second instruction for invalidating said first translation look-aside buffer.

10. The multi-processor system according to claim 1, further comprising:

an invalidation bus for carrying an invalidation message to other processors of said plurality of processors.

11. The multi-processor system according to claim 9, further comprising:

an invalidation bus for carrying an invalidation message to each invalidation controller of said plurality of processors.

12. A processor, comprising:

a first translation look-aside buffer for storing pairs of logical addresses and physical addresses;

an invalidation controller for invalidating an address range in said translation look-aside buffer; and a range comparator for comparing a designated logical address with that address range in a translation look-aside buffer of another processor which is currently being invalidated by an invalidation controller of said another processor, and for allowing the translation of the designated logical address into a physical address by said first translation look-aside buffer when the designated logical address is out of the address range.

13. The processor according to claim 12, said range comparator comprising:

an address compare circuit for comparing the designated logical address with the address range being invalidated; and a pending indicator for stopping address translation of said designated logical address, when said address compare circuit detects that the designated logical address is in the address range.

14. The processor according to claim 13, said address compare circuit comprising:

a plurality of coincidence gates for detecting coincidence between the designated logical address and the address range;

a plurality of mask gates, connected to said plurality of coincidence gates, for masking bits indicated by the address range; and a gate, connected to said plurality of mask gate, for performing a logical operation on outputs of said plurality of mask gates.

15. The processor according to claim 14, each of said plurality of coincidence gates comprising an exclusive-NOR gate.

16. The processor according to claim 14, each of said plurality of mask gates comprising an OR gate.

17. The processor according to claim 14, said gate comprising an AND gate.

18. The processor according to claim 13, said range comparator further comprising:

a restart indicator for restarting the address translation, when said address compare circuit detects that the designated logical address is out of the address range.

19. A method of controlling an access to a first translation look-aside buffer in a multi-processor system having a plurality of processors, said method comprising:

receiving, by a processor, an instruction for invalidating an address range of said first translation look-aside buffer;

preventing access, by said processor, to said address range being invalidated until the invalidation of said address range of said first translation look-aside buffer is completed;

receiving an address to be accessed;

determining whether the address is in the address range;

translating the address if the address is determined to be out of the address range; and stopping translating the address if the address is determined to be in the address range;

wherein said determining includes comparing a designated logical address with that address range in a translation look-aside buffer of another processor which is currently being invalidated by an invalidation controller, and wherein translation of the designated logical address into a physical address by said first translation look-aside buffer is allowed when the designated logical address is out of the address range.

20. The method according to claim 19, said method further comprising:

restarting translating the address if the address becomes out of the address range.

* * * * *